(12) United States Patent
Minjeur et al.

(10) Patent No.: US 10,766,403 B1
(45) Date of Patent: Sep. 8, 2020

(54) VEHICLE HEADLAMP LIGHTING STRATEGY

(71) Applicant: GM GLOBAL TECHNOLOGY OPERATIONS LLC, Detroit, MI (US)

(72) Inventors: Patrick Minjeur, Sterling Heights, MI (US); Michael K. Larsen, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 16/793,781

(22) Filed: Feb. 18, 2020

(51) Int. Cl.
  *B60Q 1/14* (2006.01)
  *H05B 45/10* (2020.01)
  *B60Q 1/00* (2006.01)
  *F21S 41/141* (2018.01)
  *H05B 47/125* (2020.01)

(52) U.S. Cl.
  CPC .......... *B60Q 1/143* (2013.01); *B60Q 1/0023* (2013.01); *F21S 41/141* (2018.01); *H05B 45/10* (2020.01); *H05B 47/125* (2020.01)

(58) Field of Classification Search
  CPC ........ H05B 45/00; H05B 45/40; H05B 45/20; H05B 47/00; H05B 47/10; H05B 47/125; F21S 41/141; B60Q 1/143; B60Q 1/0023; B60Q 1/02; B60Q 1/04
  See application file for complete search history.

(56) References Cited

U.S. PATENT DOCUMENTS

2013/0177202 A1* 7/2013 Dierks ................. G06K 9/3241 382/103
2013/0265561 A1* 10/2013 Takahira ............... F21S 41/176 356/3

\* cited by examiner

*Primary Examiner* — Jimmy T Vu
(74) *Attorney, Agent, or Firm* — Quinn IP Law

(57) ABSTRACT

A method includes generating a first beam pattern via a headlamp assembly arranged on a motor vehicle and detecting, via a camera, an object in the first light beam pattern. The method additionally includes receiving, via an electronic controller, a signal from the camera indicative of the object, identifying the object as another motor vehicle, and determining a distance between the headlamp assembly and the other vehicle. The method also includes determining a first amount of glare the first beam pattern generates to the other vehicle at the determined distance and identifying when the first amount of glare exceeds target glare. The method further includes identifying a second beam pattern corresponding to a second amount of glare that is below the target glare and switching the headlamp assembly from generating the first beam pattern to generating the second light beam pattern.

20 Claims, 2 Drawing Sheets

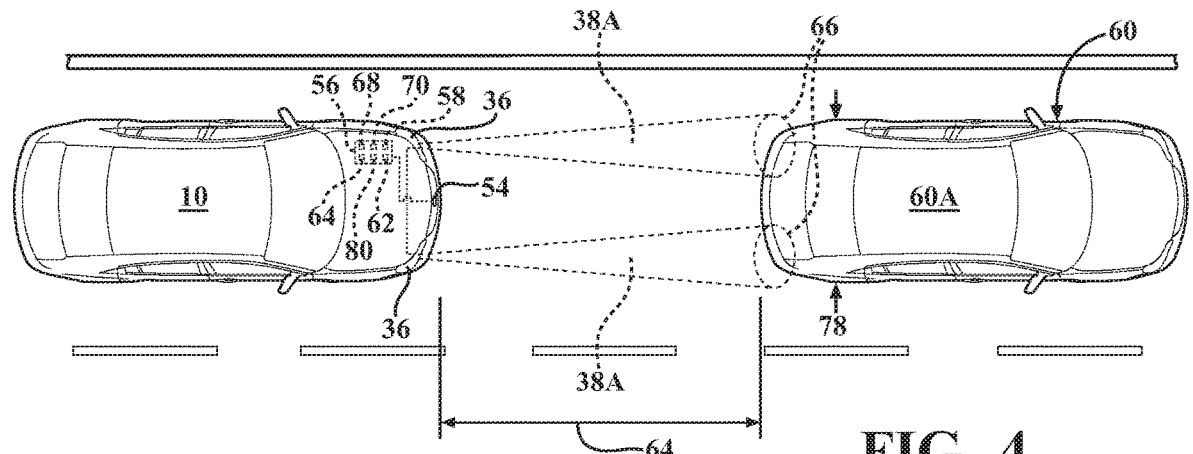
FIG. 4
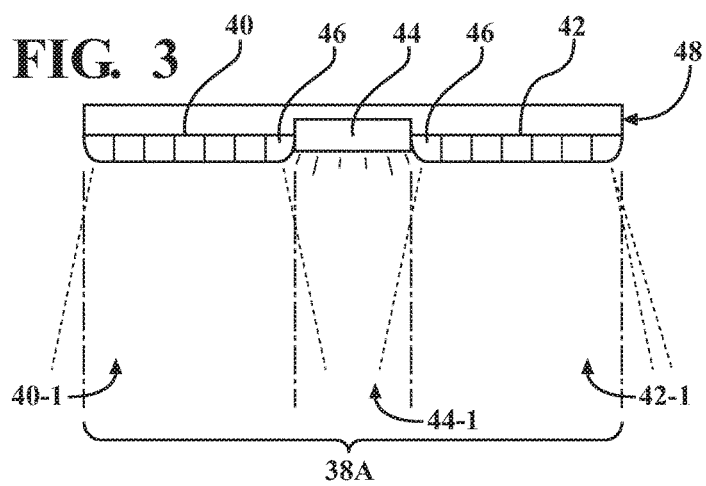
FIG. 3
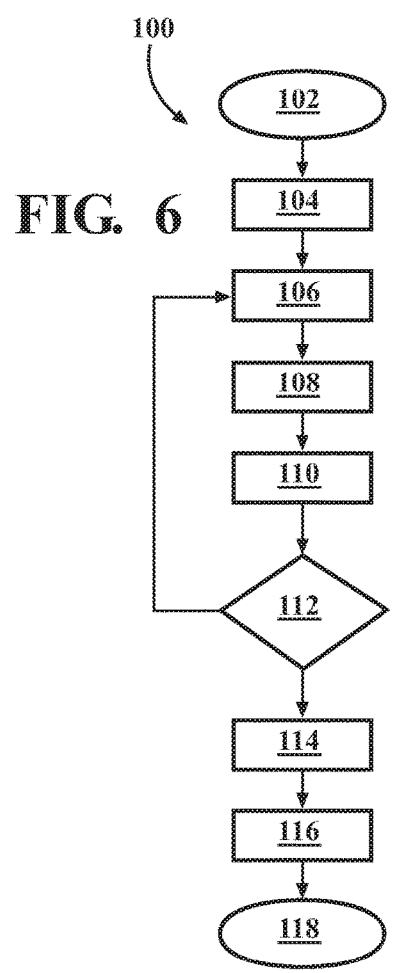
FIG. 5
FIG. 6

VEHICLE HEADLAMP LIGHTING STRATEGY

INTRODUCTION

The disclosure relates to lighting strategy for a motor vehicle headlamp.

Motor vehicles are typically equipped with exterior lighting systems to provide exterior illumination for the operator to safely operate the vehicle in low-light conditions, such as nighttime driving, and to increase the conspicuity of the vehicle. Such lighting systems also display information about the vehicle's presence, position, size, direction of travel, as well as providing signaling functions to indicate the operator's intended maneuvering of the vehicle, for example, to operators of other, approaching vehicles. A headlamp is generally a lighting unit or module attached to the front of a vehicle to illuminate the road ahead of the subject vehicle.

Headlamps are designed to provide wide visibility for the host vehicle's driver, while avoiding glaring to oncoming or leading vehicles. A headlamp alternatively provides high beam and low beam illumination. High beam generally has a bright, center-weighted distribution of light with no particular control of light directed towards other road users' eyes. High beam is primarily suitable for use when the host vehicle is alone on the road, as the glare the high beam produces will typically dazzle other drivers. Low beam generates a distribution of light designed to provide forward and lateral illumination, with limits on light directed towards the eyes of other road users to control glare. Accordingly, low beam is intended for use whenever other vehicles are present ahead, whether oncoming or being overtaken by the host vehicle.

SUMMARY

A method of operating a headlamp assembly arranged on a motor vehicle includes generating a first beam pattern via the headlamp assembly. The method also includes detecting, via a camera, an object, such as a leading or oncoming second motor vehicle, in the first light beam pattern. The method additionally includes receiving, via an electronic controller, a signal from the camera indicative of the detected object and identifying the detected object as another motor vehicle. The method also includes determining, via the electronic controller, a distance between the headlamp assembly and the other motor vehicle using the signal from the camera. The method additionally includes determining, via the electronic controller, a first amount of glare the first beam pattern generates to the other motor vehicle at the determined distance, and identifying when the first amount of glare exceeds target glare. The method also includes identifying, via the electronic controller, a second beam pattern corresponding to a second amount of glare that is below the target glare. The method further includes regulating the headlamp assembly, via the electronic controller, to switch from generating the first beam pattern to generating the second light beam pattern.

The headlamp assembly may include a first segment array configured to generate an additive first section of the first light beam pattern, a second segment array configured to generate an additive second section of the first light beam pattern, and a third segment array configured to generate a third section of the first light beam pattern. In such an embodiment, the entirety of the first segment array, second segment array, and third segment array is configured to generate a light output defining a high beam of the headlamp assembly.

Regulating the headlamp assembly to switch from the first beam pattern to the second beam pattern may include turning off a portion of at least one of the first and second segment arrays.

The headlamp assembly may additionally include a fourth segment array configured to generate a light output defining a low beam of the headlamp assembly.

The method may additionally include maintaining the fourth segment array in an activated state when either the first beam pattern or the second beam pattern is generated.

Regulating the headlamp assembly to switch from the first beam pattern to the second beam pattern may include turning off the third segment array.

The first segment array, the second segment array, and the third segment array may be arranged in a module. The third segment array may be arranged horizontally between the first segment array and the second segment array, such that turning off the third segment array generates a shadow in the middle of the second light beam pattern.

Determining the first amount of glare the first beam pattern generates to the other motor vehicle includes determining a width of the other motor vehicle, and wherein determining the second beam pattern includes determining a size of the shadow required in the second light beam pattern.

Regulating the headlamp assembly to switch from the first beam pattern to the second beam pattern may include progressively dimming at least one of the first and second segment arrays.

Each of the first, second, and third segment arrays may include a light-emitting diode (LED). In such an embodiment, progressively dimming at least one of the first and second segment arrays may include progressively dimming the respective LED.

A motor vehicle employing an electronic controller in communication with a headlamp assembly and a camera and configured to perform the above method is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

BRIEF DESCRIPTION OF THE DRAWINGS

FIG. 3 is a schematic top view of the headlamp assembly shown in FIG. 2, the headlamp assembly depicted generating the high beam light pattern.

FIG. 4 is a schematic top view of the headlamp assemblies of the motor vehicle shown in FIG. 1 generating high beam light pattern via each headlamp assembly onto another or second motor vehicle.

FIG. 5 is a schematic top view of the headlamp assembly shown in FIG. 3, the headlamp assembly depicted generating a second beam light pattern having a reduced amount of glare onto the second motor vehicle shown in FIG. 4, according to the disclosure.

FIG. 6 is a flow diagram of a method of operating the headlamp assembly arranged on the motor vehicle shown in FIGS. 1-5, according to the present disclosure.

DETAILED DESCRIPTION

Figure 1:
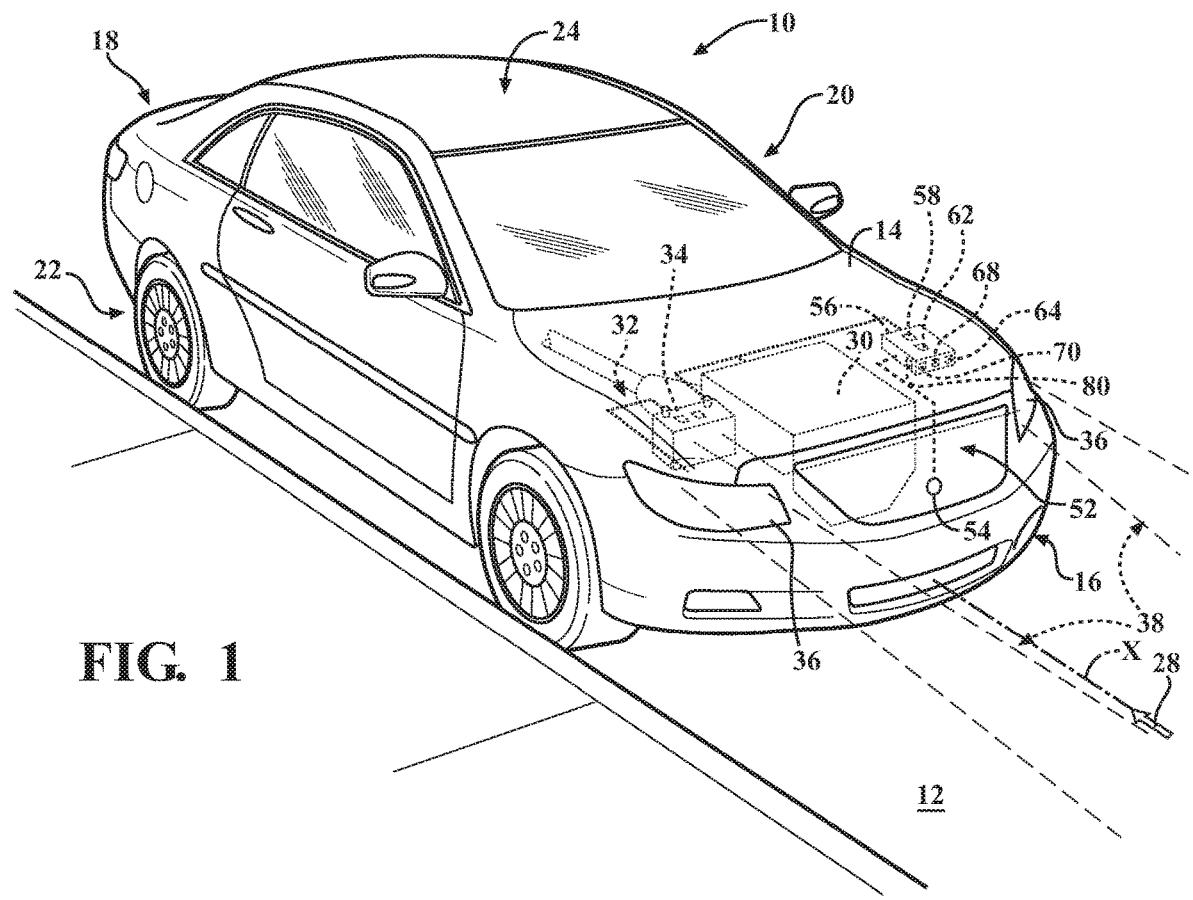
FIG. 1 is a schematic perspective illustration of a motor vehicle having a vehicle body and a plurality of headlamp assemblies mounted to the vehicle body, according to the disclosure.

Referring to the drawings, wherein like reference numbers refer to like components, FIG. 1 shows a schematic view of a motor vehicle 10 positioned relative to a road surface 12. The vehicle 10 includes a vehicle body 14 arranged along a virtual longitudinal axis X and substantially parallel to the road surface 12. The vehicle body 14 defines six body sides. The six body sides include a first body end or front end 16, an opposing second body end or rear end 18, a first lateral body side or left side 20, and a second lateral body side or right side 22, a top body portion 24, which may include a vehicle roof, and an underbody portion (not shown).

The left side 20 and right side 22 are disposed generally parallel to each other and with respect to the longitudinal axis X, and span the distance between the front end 16 and the rear end 18. The vehicle body 14 is defined to include the longitudinal axis X. A passenger compartment (not shown) of the vehicle 10 is generally bounded by the front and rear ends 16, 18 and the left and right sides 20, 22 of the body 14. The front end 16 is configured to face an oncoming ambient airflow 28 when the vehicle 10 is in motion relative to the road surface 12. When the vehicle 10 is in motion, the oncoming ambient airflow 28 moves substantially parallel to the body 14 and along the longitudinal axis X. As shown, the vehicle 10 may also include a powerplant 30, such as an internal combustion engine, a hybrid-electric powertrain (not shown), or other alternative types of propulsion systems.

As shown in FIG. 1, the vehicle 10 also includes an electrical system 32 having an energy storage device 34, such as one or more batteries, configured to accept an electric charge. The electrical system 32 is configured to supply electric current to operate vehicle headlamp assemblies 36 configured to generate respective light beams 38 (shown in FIG. 1). In general, headlamp assemblies provide exterior illumination of the road surface 12 ahead of the host motor vehicle 10, specifically to indicate the vehicle's presence, e.g., position, size, and direction of travel, as well indicating the operator's maneuvering of the vehicle, for example, to operators of other, approaching or leading vehicles. Although the present disclosure focuses on the headlamp assembly 36 as employed for exterior lighting of motor vehicles, nothing precludes the light-emitting assembly and the associated system described below from being employed in other, non-automotive applications. Although the disclosure below focuses on description of a single headlamp assembly 36, as shown, the vehicle 10 includes a pair of such headlamp assemblies, one on each side of the longitudinal axis X.

Figure 2:
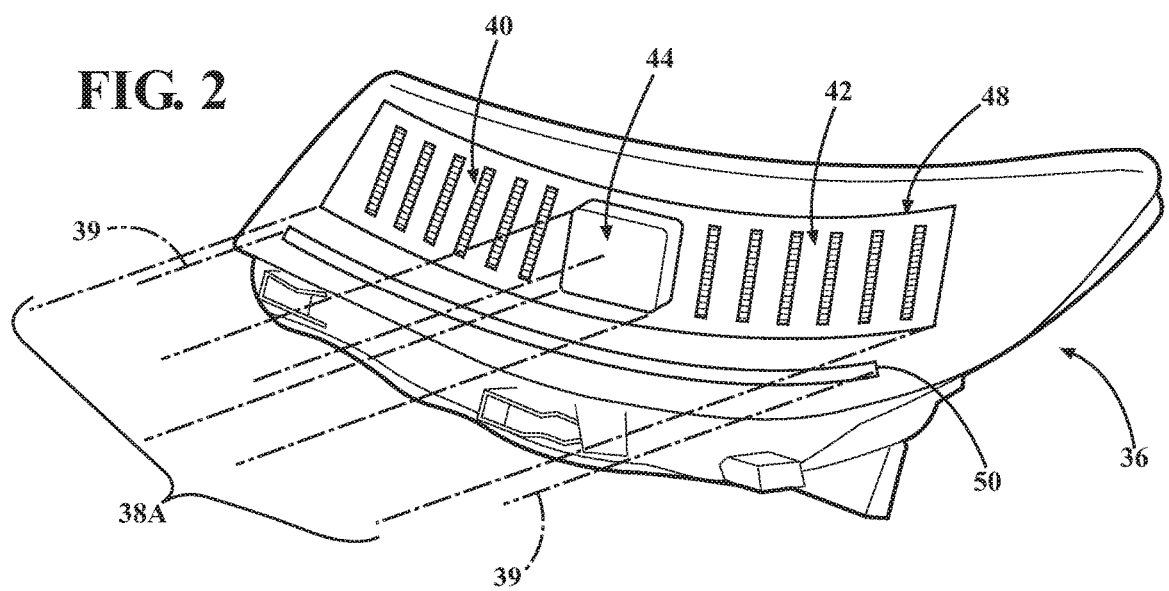
FIG. 2 is a schematic perspective view of a generalized headlamp assembly shown in FIG. 1, including a module having first, second, and third segment arrays together configured to generate a first or high beam light pattern, and a fourth segment array configured to generate a low beam light pattern, according to the disclosure.

Generally, headlamp assemblies 36 provide illumination ahead of the host motor vehicle 10, i.e., illuminate the road surface 12 ahead of the vehicle with projected and specifically aimed light beams 38 of variable intensity. In on-highway motor vehicle applications, the light beam 38 each headlamp assembly 36 is required to alternatively produce may be composed of a first or high beam 38A and a low beam 39 (shown in FIG. 2). Generally, a high beam casts most of its light straight ahead, maximizing seeing distance for the host vehicle's operator, but also producing too much glare for other vehicles present on the road. Because high beams have no specific control of upward light, high beams typically also cause backdazzle from fog, rain, and snow due to the retroreflection (reflection back to the source with minimum scattering) of the water droplets. On the other hand, a low beam has stricter control of upward light, and directs most of its light downward and to the side, specifically away from oncoming traffic, to provide forward visibility without excessive glare or backdazzle.

As shown in FIG. 3, the headlamp assembly 36 may include a first segment array 40 configured to generate an additive first section 40-1 of the high beam 38A light pattern. The headlamp assembly 36 may also include a second segment array 42 configured to generate an additive second section 42-1 of the high beam 38A light pattern. The headlamp assembly 36 may additionally include a third segment array 44 configured to generate a third section 44-1 of the high beam 38A light pattern. Together, the first segment array 40, second segment array 42, and third segment array 44 in their entirety are configured to generate a light output pattern defining the high beam 38A of the headlamp assembly 36. Each of the first, second, and third segment arrays 40, 42, 44 includes a light-emitting diode (LED) 46.

The first segment array 40, the second segment array 42, and the third segment array 44 may be arranged in a module 48, as shown in FIG. 3. As shown, in the module 48 the third segment array 44 is arranged horizontally between the first segment array 40 and the second segment array 42. Furthermore, the headlamp assembly 36 may include a fourth segment array 50 (shown in FIG. 3) configured to generate a light output defining the low beam 39 of the headlamp assembly 36. The fourth segment array 50 may be arranged below the module 48, i.e., below the first, second, and third segment arrays 40, 42, 44. With the aid of an electronic controller to be described in detail below, the module 48 may adapt the light beam 38 of the headlamp assembly 36 to objects or vehicles in the oncoming or leading traffic.

The motor vehicle 10 is a host to a headlamp system 52. The headlamp system 52 includes the headlamp assembly 36, and also includes a camera 54 (shown in FIG. 1) configured to detect a view of a terrain, such as the road surface 12, and various objects ahead of the vehicle 10. As also shown in FIG. 1, the headlamp system 52 additionally includes a programmable electronic controller 56 in communication with the camera 54 and configured to regulate operation of the headlamp assembly 36 in response to vehicle surroundings detected via the camera. The controller 56 includes a memory that is tangible and non-transitory. The memory may be a recordable medium that participates in providing computer-readable data or process instructions. Such a medium may take many forms, including but not limited to non-volatile media and volatile media. Non-volatile media used by the controller 56 may include, for example, optical or magnetic disks and other persistent memory. The controller 56 includes an algorithm that may be implemented as an electronic circuit, e.g., FPGA, or as an algorithm saved to non-volatile memory. Volatile media of the controller 56 memory may include, for example, dynamic random-access memory (DRAM), which may constitute a main memory.

The controller 56 may communicate with the headlamp assembly 36 and the camera 54 via a signal transmission medium, including coaxial cables, copper wire and fiber optics, including the wires in a system bus coupling a specific controller to an individual processor. Memory of the controller 56 may also include a flexible disk, hard disk, magnetic tape, other magnetic medium, a CD-ROM, DVD, other optical medium, etc. The controller 56 may be equipped with a high-speed primary clock, requisite Analog-to-Digital (A/D) and/or Digital-to-Analog (D/A) circuitry, input/output circuitry and devices (I/O), as well as appropriate signal conditioning and/or buffer circuitry. Algorithms required by the controller 56 or accessible thereby may be stored in the controller memory and automatically executed to provide the required functionality. The controller 56 may be configured, i.e., structured and programmed, to receive and process captured raw data signals gathered by the camera 54.

The electronic controller 56 is specifically configured to regulate the headlamp assembly 36 to generate the first/high beam 38A pattern. As shown in FIG. 4, the electronic controller 56 is also configured to receive a signal 58, such as an image, from the camera 54 indicative of an object 60 detected in the high beam 38A pattern. Using the signal 58, the controller 56 is additionally configured to recognize or identify the detected object 60 as another or second motor vehicle 60A (also shown in FIG. 4), for example leading or approaching the vehicle 10 (which in such an instance may be considered the first motor vehicle). For example, the electronic controller 56 may employ a trained Neural Network architecture 62 (shown in FIG. 1) to recognize an image of the detected object 60 as the other vehicle 60A Alternatively, the camera 54 may be configured to respond to leading and oncoming vehicles while disregarding other, less relevant signals.

The electronic controller 56 is also configured to determine a distance 64 between the headlamp assembly 36, i.e., the vehicle 10, and the second motor vehicle 60A using the signal 58 from the camera 54. The electronic controller 56 is additionally configured to determine a first amount of glare 66 the high beam 38A pattern generates to the second motor vehicle 60A at the determined distance 64. A permissible amount of glare may be determined empirically in response to levels set based on predetermined requirements. Generally, the camera 54 sensitivity may be adjusted to maintain the required amount of lighting from the module 48. For example, the first/high beam 38A pattern, such that, after the camera detects the object, instead of reacting right away, the camera 54 reacts at a distance closer to the oncoming/preceding object. The controller 56 is also configured to identify when the first amount 66 of glare exceeds a predetermined or target 68 amount of glare.

The controller 56 is further configured to identify a second beam 38B pattern corresponding to, i.e., which would generate, a second amount 70 of glare that is below the target 68 glare. The controller 56 will then regulate the headlamp assembly 36 to switch from generating the high beam 38A pattern to generating the second beam 38B pattern. The controller 56 may regulate the headlamp assembly 36 to switch from the first beam 38A pattern to the second beam 38B pattern via turning off the third segment array 44. Specifically, turning off the third segment array 44 is intended to block out a portion, in the present embodiment the third section 44-1 of the high beam 38A light pattern, and thereby generate the second beam 38B pattern. Turning off the third segment array 44 may then generate a shadow 72 in the middle of the second light beam 38B pattern. Accordingly, the second beam 38B pattern is a specifically selected portion of the high beam 38A pattern.

The electronic controller 56 may be configured to regulate the headlamp assembly 36 to switch from the first beam 38A pattern to the second beam 38B pattern via turning off a portion 74, i.e., at least one segment, of at least one of the first segment array 40 and the second segment array 42. Specifically, the portion 74 may include at least one LED 46 of the first segment array 40 and the second segment array 42, such that the subject LEDs may be selectively turned off In other words, the electronic controller 56 may first turn off the third segment array 44, and then additionally turn off the portion 74 of the first segment array 40 and/or the second segment array 42 to arrive at the identified second beam 38B pattern. Alternatively, the electronic controller 56 may be configured to regulate the headlamp assembly 36 to switch from the first beam 38A pattern to the second beam 38B pattern via additionally progressively dimming at least one of the first segment array 40 and the second segment array 42, thereby reducing the light intensity of the headlamp assembly. In other words, the electronic controller 56 may first turn off the third segment array 44, and then additionally progressively dim the first segment array 40 and/or the second segment array 42 to arrive at the identified second beam 38B pattern. Specifically, the controller 56 may be configured to switch from the first beam 38A pattern to the second beam 38B pattern via progressively dimming respective LEDs 46 of the first and/or second segment arrays 40, 42.

The electronic controller 56 may be configured to maintain the fourth segment array 50 in an activated state when either the first beam 38A pattern or the second beam 38B pattern is generated, such that the low beam 39 remains on throughout the adjustment of the light output of the headlamp assembly 36. The electronic controller 56 may be configured to determine the first amount 66 of glare the first beam pattern 38A generates to the second motor vehicle 60A via determining a width 78 of the second motor vehicle. The electronic controller 56 may be further configured to determine the second beam pattern 38B via determining a size 80 of the shadow 72 required in the second light beam 38B pattern. The size 80 of the shadow 72 may be determined from the image communicated via the signal 58 by the camera 54 in the high beam 38A pattern. The size 80 of the shadow 72 in the second light beam pattern 38B may specifically be a horizontal length of the subject shadow, as shown in FIG. 5.

FIG. 6 depicts a method 100 of operating the headlamp assembly 36, as described above with respect to FIGS. 1-5. The method 100 may be performed via the headlamp system 52 utilizing the electronic controller 56 programmed with respective algorithms. The method 100 initiates in frame 102 with the vehicle 10 in motion relative to and illuminating the road surface 12 via its headlamp assemblies 36. Following frame 102, the method proceeds to frame 104, where the method includes generating, via the headlamp assembly 36, the first or high beam 38A pattern. After frame 104, the method advances to frame 106. In frame 106 the method includes detecting, via the camera 54, object 60 in the high beam 38A pattern.

Following frame 106, the method proceeds to frame 108. In frame 108 the method includes receiving, via the electronic controller 56, the signal 58 from the camera 54 indicative of the detected object 60 and identifying the detected object as the second, either oncoming or leading motor vehicle 60A. After frame 108, the method advances to frame 110. In frame 110 the method includes determining, via the electronic controller 56, the distance 64 between the headlamp assembly 36 and the second motor vehicle 60A using the signal 58 from the camera 54. Following frame 110, the method moves on to frame 112.

In frame 112, the method includes determining, via the electronic controller 56, the first amount of glare 66 the first beam pattern 38A generates to the second motor vehicle 60A at the determined distance 64. As described above with respect to FIGS. 1-5, determining the first amount of glare 66 generated by the first beam pattern 38A to the second motor vehicle 60A may include determining the width 78 of the second motor vehicle, such as via determining a size of the shadow 72 required in the second light beam 38B pattern. In frame 112, the method additionally includes identifying when the first amount of glare 66 exceeds the target amount of glare 68.

If in frame 112 the controller 56 determines that the first amount of glare 68 does not exceed the target amount of glare 68, the method may return to frame 106. Otherwise, after frame 112, the method advances to frame 114. In frame 114 the method includes identifying, via the electronic controller 56, the second beam pattern 38B corresponding to the second amount of glare 70 that is below the target glare 68. Following frame 114, the method moves on to frame 116. In frame 116, the method includes regulating the headlamp assembly 36, via the electronic controller 56, to switch from generating the first beam 38A pattern to generating the second light beam 38B pattern.

As described above with respect to FIGS. 1-5, regulating the headlamp assembly 36 to switch from the first beam pattern 38A to the second beam pattern 38B may include turning off the third segment array 44. Furthermore, regulating the headlamp assembly 36 to switch from the first beam pattern 38A to the second beam pattern 38B may also include turning off portion 74 of the first and/or second segment arrays 40, 42, such as at least one respective LED 46 segment. Alternatively, regulating the headlamp assembly 36 to switch from the first beam pattern 38A to the second beam pattern 38B may additionally include progressively dimming at least one of the first and second segment arrays 40, 42, such as progressively dimming the respective LEDs 46. Switching from the first beam pattern 38A to the second beam pattern 38B may be accompanied by maintaining the fourth segment array 50 in an activated state.

Following the switch from the headlamp assembly 36 generating the first beam 38A pattern to generating the second light beam 38B pattern in frame 116, the method may return to frame 106 for detecting, via the camera 54, the second vehicle 60A or another object 60 in the second beam 38B pattern for continued regulation of the headlamp assembly 36 light output and the beam pattern generated by the headlamp assembly. Alternatively, if for example the vehicle has reached is chosen destination, following frame 116 the method may conclude in frame 118.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A method of operating a headlamp assembly arranged on a first motor vehicle, the method comprising:
generating, via the headlamp assembly, a first beam pattern;
detecting, via a camera, an object in the first beam pattern;
receiving, via an electronic controller, a signal from the camera indicative of the detected object and identifying the detected object as a second motor vehicle;
determining, via the electronic controller, a distance between the headlamp assembly and the second motor vehicle using the signal from the camera;
determining, via the electronic controller, a first amount of glare the first beam pattern generates to the second motor vehicle at the determined distance, and identifying when the first amount of glare exceeds a target glare;
identifying, via the electronic controller, a second beam pattern corresponding to a second amount of glare that is below the target glare; and
regulating the headlamp assembly, via the electronic controller, to switch from generating the first beam pattern to generating the second beam pattern.

2. The method according to claim 1, wherein the headlamp assembly includes a first segment array configured to generate an additive first section of the first beam pattern, a second segment array configured to generate an additive second section of the first beam pattern, and a third segment array configured to generate a third section of the first beam pattern, and wherein the entirety of the first segment array, second segment array, and third segment array is configured to generate a light output defining a high beam of the headlamp assembly.

3. The method according to claim 2, wherein regulating the headlamp assembly to switch from the first beam pattern to the second beam pattern includes turning off a portion of at least one of the first and second segment arrays.

4. The method according to claim 2, wherein the headlamp assembly additionally includes a fourth segment array configured to generate a light output defining a low beam of the headlamp assembly.

5. The method according to claim 4, further comprising maintaining the fourth segment array in an activated state when either the first beam pattern or the second beam pattern is generated.

6. The method according to claim 2, wherein regulating the headlamp assembly to switch from the first beam pattern to the second beam pattern includes turning off the third segment array.

7. The method according to claim 6, wherein the first segment array, the second segment array, and the third segment array are arranged in a module, and the third segment array is arranged horizontally between the first segment array and the second segment array, such that turning off the third segment array generates a shadow in the second beam pattern.

8. The method according to claim 7, wherein determining the first amount of glare the first beam pattern generates to the second motor vehicle includes determining a width of the second motor vehicle, and wherein determining the second beam pattern includes determining a size of the shadow required in the second beam pattern.

9. The method according to claim 6, wherein regulating the headlamp assembly to switch from the first beam pattern to the second beam pattern additionally includes progressively dimming at least one of the first and second segment arrays.

10. The method according to claim 9, wherein each of the first, second, and third segment arrays includes a light-emitting diode (LED), and wherein progressively dimming at least one of the first and second segment arrays includes progressively dimming the respective LED.

11. A motor vehicle comprising:
a headlamp assembly configured to provide illumination ahead of the motor vehicle;
a camera configured to detect a view of a terrain; and
an electronic controller in communication with the headlamp assembly and the camera and configured to:
regulate the headlamp assembly to generate a first beam pattern;
receive a signal from the camera indicative of a detected object and identify the detected object as another motor vehicle detected in the first beam pattern;
determine a distance between the headlamp assembly and the other motor vehicle using the signal from the camera;
determine a first amount of glare the first beam pattern generates to the other motor vehicle at the determined distance, and identify when the first amount of glare exceeds a target glare;
identify a second beam pattern corresponding to a second amount of glare that is below the target glare; and
regulate the headlamp assembly to switch from generating the first beam pattern to generating the second beam pattern.

12. The motor vehicle according to claim 11, wherein the headlamp assembly includes a first segment array configured to generate an additive first section of the first beam pattern, a second segment array configured to generate an additive second section of the first beam pattern, and a third segment array configured to generate a third section of the first beam pattern, and wherein the entirety of the first segment array, second segment array, and third segment array is configured to generate a light output defining a high beam of the headlamp assembly.

13. The motor vehicle according to claim 12, wherein the electronic controller is configured to regulate the headlamp assembly to switch from the first beam pattern to the second beam pattern via turning off a portion of at least one of the first and second segment arrays.

14. The motor vehicle according to claim 12, wherein the headlamp assembly additionally includes a fourth segment array configured to generate a light output defining a low beam of the headlamp assembly.

15. The motor vehicle according to claim 14, wherein the electronic controller is configured to maintain the fourth segment array in an activated state when either the first beam pattern or the second beam pattern is generated.

16. The motor vehicle according to claim 12, wherein the electronic controller is configured to regulate the headlamp assembly to switch from the first beam pattern to the second beam pattern via turning off the third segment array.

17. The motor vehicle according to claim 16, wherein the first segment array, the second segment array, and the third segment array are arranged in a module, and the third segment array is arranged horizontally between the first segment array and the second segment array, such that turning off the third segment array generates a shadow in the second beam pattern.

18. The motor vehicle according to claim 17, wherein the electronic controller is configured to determine the first amount of glare the first beam pattern generates to the other motor vehicle via determining a width of the other motor vehicle, and wherein the electronic controller is configured to determine the second beam pattern via determining a size of the shadow required in the second beam pattern.

19. The motor vehicle according to claim 16, wherein the electronic controller is configured to regulate the headlamp assembly to switch from the first beam pattern to the second beam pattern via progressively dimming at least one of the first and second segment arrays.

20. The motor vehicle according to claim 19, wherein each of the first, second, and third segment arrays includes a light-emitting diode (LED), and wherein the electronic controller is configured to progressively dim at least one of the first and second segment arrays via progressively dimming the respective LED.

* * * * *